(12) United States Patent  
Tsuzuki et al.

(10) Patent No.: US 7,499,675 B2  
(45) Date of Patent: Mar. 3, 2009

(54) VEHICLE-TO-VEHICLE COMMUNICATION SYSTEM

(75) Inventors: Kiyoshi Tsuzuki, Chita-gun (JP); Ichiro Yoshida, Takahama (JP); Kazuyoshi Azuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/593,567

(22) Filed: Nov. 7, 2006

(65) Prior Publication Data

US 2007/0106431 A1    May 10, 2007

(30) Foreign Application Priority Data

Nov. 7, 2005    (JP)    ............... 2005-322705

(51) Int. Cl.
*H04B 1/38*    (2006.01)
*G05D 1/00*    (2006.01)
(52) U.S. Cl. ............... 455/73; 701/1; 455/78; 455/575.9; 455/99; 455/166.1; 455/186.1
(58) Field of Classification Search ............ 701/208, 701/301; 700/304; 370/342, 343; 342/357.06, 342/455; 340/903, 531, 870.18, 853.1, 853.2, 340/853.3, 853.9, 855.3, 855.4, 870.01–870.44, 340/901–905, 426.16, 435, 436, 445–448, 340/502–540, 825–825.02, 2.1–3.9, 825.36, 340/825.39, 7.1–7.63, 825.49, 825.53; 398/125; 455/462–466, 41.1, 41.2, 500, 90.2, 179.1–200.1
See application file for complete search history.

(56) References Cited

U.S. PATENT DOCUMENTS

| | | | | |
|---|---|---|---|---|
| 5,179,569 A | * | 1/1993 | Sawyer | ............... 375/133 |
| 5,182,543 A | * | 1/1993 | Siegel et al. | ............... 340/531 |
| 5,396,426 A | * | 3/1995 | Hibino et al. | ............... 701/96 |
| 5,907,293 A | * | 5/1999 | Tognazzini | ............... 340/903 |
| 5,959,572 A | * | 9/1999 | Higashimata et al. | ......... 342/70 |
| 5,966,227 A | * | 10/1999 | Dubois et al. | ............... 398/169 |
| 6,442,484 B1 | * | 8/2002 | Miller et al. | ............... 701/301 |
| 6,491,420 B1 | * | 12/2002 | Scifres | ............... 362/553 |
| 2001/0048691 A1 | * | 12/2001 | Chang et al. | ............... 370/442 |
| 2004/0190487 A1 | * | 9/2004 | Biggs | ............... 370/350 |
| 2006/0015242 A1 | | 1/2006 | Yoshida | |

FOREIGN PATENT DOCUMENTS

| | | |
|---|---|---|
| JP | A-05-266399 | 10/1993 |
| JP | A-08-163018 | 6/1996 |
| JP | A-09-051309 | 2/1997 |
| JP | A-10-111360 | 4/1998 |
| JP | A-2002-367081 | 12/2002 |
| JP | A-2004-310483 | 11/2004 |

* cited by examiner

*Primary Examiner*—Khoi Tran
*Assistant Examiner*—Bhavesh Amin
(74) *Attorney, Agent, or Firm*—Posz Law Group, PLC

(57) ABSTRACT

A vehicle-to-vehicle communication device mounted in a subject vehicle includes (i) a transmitter-receiver for communication with other vehicle-to-vehicle communication devices mounted in other vehicles, (ii) a memory that stores communication wavelengths assigned to the other vehicles, and (iii) a communication control unit. When a certain vehicle is determined to be within a dangerous distance from the subject vehicle, the communication control unit refers to a communication wavelength assigned to the certain vehicle stored in the memory. When the communication wavelength assigned to the certain vehicle is identical to a communication wavelength assigned to the subject vehicle, the communication wavelength assigned to the subject vehicle is changed to another communication wavelength different from the communication wavelength assigned to the certain vehicle.

6 Claims, 10 Drawing Sheets

FIG. 1

| SPEED (km/H) | | LIMIT DISTANCE F LONGITUDINAL (m) | LIMIT DISTANCE M TRAVERSE (m) |
|---|---|---|---|
| 0−10 | | 10 | 3 |
| 10−40 | =Vℓ | Vℓ/2 | 5 |
| 40−100 | =Vh | Vh | 7 |
| ≧100 | | 100 | 10 |

VEHICLE-TO-VEHICLE COMMUNICATION SYSTEM

CROSS REFERENCE TO RELATED APPLICATION

This application is based on and incorporates herein by reference Japanese Patent Application No. 2005-322705 filed on Nov. 7, 2005.

FIELD OF THE INVENTION

The present invention relates to a vehicle-to-vehicle communication system that enables communication between vehicles even when there are multiple vehicles ahead or even when light from an oncoming vehicle is received as noise.

BACKGROUND OF THE INVENTION

There are conventionally known running control devices that grasp traffic situation ahead by vehicle-to-vehicle information communication and control various devices present in a vehicle based on this information. Some of such running control devices are based on automobile-to-automobile communication. Such a running control device in a subject vehicle includes: a receiving means that receives information from another vehicle present ahead; a transmitting means that transmits the result, which is obtained by processing information on vehicles running ahead and the subject vehicle, to other vehicles present behind; and a running information processing means connected with various controllers present in the subject vehicle. The running control device is so constructed that it assists the safe running of the subject vehicle by collecting information on nearby vehicles and controlling the various controllers in the subject vehicle.

(Refer to Patent Document 1, for example.)

Some of such running control devices include in a subject vehicle: a front light transmitting/receiving unit that transmits or receives laser light signals to and from the area ahead of the subject vehicle; a rear light transmitting/receiving unit that transmits or receives laser light signals to and from the area behind the subject vehicle; and a signal relaying means that relays signals between the front light transmitting/receiving unit and the rear light transmitting/receiving unit. In this configuration, laser light signals including signals received by the front light transmitting/receiving unit are transmitted from the rear light transmitting/receiving unit; and laser light signals including signals received by the rear light transmitting/receiving unit are transmitted from the front light transmitting/receiving unit. Thus, the running control device makes it possible to pass a signal from one vehicle to another in rotation. (Refer to Patent Document 2, for example.)

Patent Document 1: JP-H05-266399 A
Patent Document 2: JP-H09-051309 A

However, the above-mentioned running control devices involve a problem. When there are multiple vehicles ahead, laser light is prone to be intercepted by those vehicles; therefore, it is difficult to appropriately carry out communication by light between vehicles. Also, when light from an oncoming vehicle is received as noise, it is difficult to appropriately carry out communication by laser light.

SUMMARY OF THE INVENTION

The invention has been made with these problems taken into account. An object of the invention is to provide a vehicle-to-vehicle communication system that appropriately carries out communication between vehicles even when there are multiple vehicles in proximity.

According to an aspect of the present invention, a vehicle-to-vehicle communication system is provided as follows. The system includes a plurality of vehicle-to-vehicle communication devices that are mounted in vehicles and communicate with one another. A vehicle-to-vehicle communication device provided in a subject vehicle includes (i) a communication wavelength storing unit that stores communication wavelengths assigned to the subject vehicle and nearby vehicles, (ii) a communication condition storing unit that stores communication conditions with respect to communication wavelengths stored in the communication wavelength storing unit, (iii) a communicating unit for communication with other vehicle-to-vehicle communication devices mounted in the nearby vehicles, and (iv) a communication controlling unit. The communication controlling unit (i) refers to the communication conditions stored in the communication condition storing unit, (ii) controls the communicating unit under a communication condition corresponding to a communication wavelength assigned to the subject vehicle to transmit information to other vehicle-to-vehicle communication devices, and (iii) controls the communicating unit under a communication condition corresponding to a communication wavelength assigned to a nearby vehicle to receive information transmitted from a vehicle-to-vehicle communication device mounted in the nearby vehicle.

According to another aspect of the present invention, a vehicle-to-vehicle communication system is provided as follows. The system includes a plurality of vehicle-to-vehicle communication devices that are mounted in vehicles and communicate with one another. A vehicle-to-vehicle communication device provided in a subject vehicle includes (i) a communication wavelength storing unit that stores a communication wavelengths, which are assigned to the subject vehicle and nearby vehicles for transmitting data, (ii) a communicating unit for transmit data to a vehicle-to-vehicle communication device mounted in a nearby vehicle by using a first communication wavelength assign to the subject vehicle and for receiving data from a vehicle-to-vehicle communication device mounted in a certain nearby vehicle by using a second communication wavelength assigned to the certain nearby vehicle, (iii) a communication wavelength amending unit. The communication wavelength amending unit (i) refers to data stored in the communication wavelength storing unit and (ii) amends the first communication wavelength to a third communication wavelength different from the second communication wavelength when determining that the first communication wavelength assigned to the subject vehicle and the second communication wavelength assigned to the certain nearby vehicle are identical with each other.

BRIEF DESCRIPTION OF THE DRAWINGS

The above and other objects, features, and advantages of the present invention will become more apparent from the following detailed description made with reference to the accompanying drawings. In the drawings:

FIG. 1 is a block diagram illustrating a configuration of a vehicle-to-vehicle communication device;

DETAILED DESCRIPTION OF THE PREFERRED EMBODIMENTS

First Embodiment

Figure 2A:
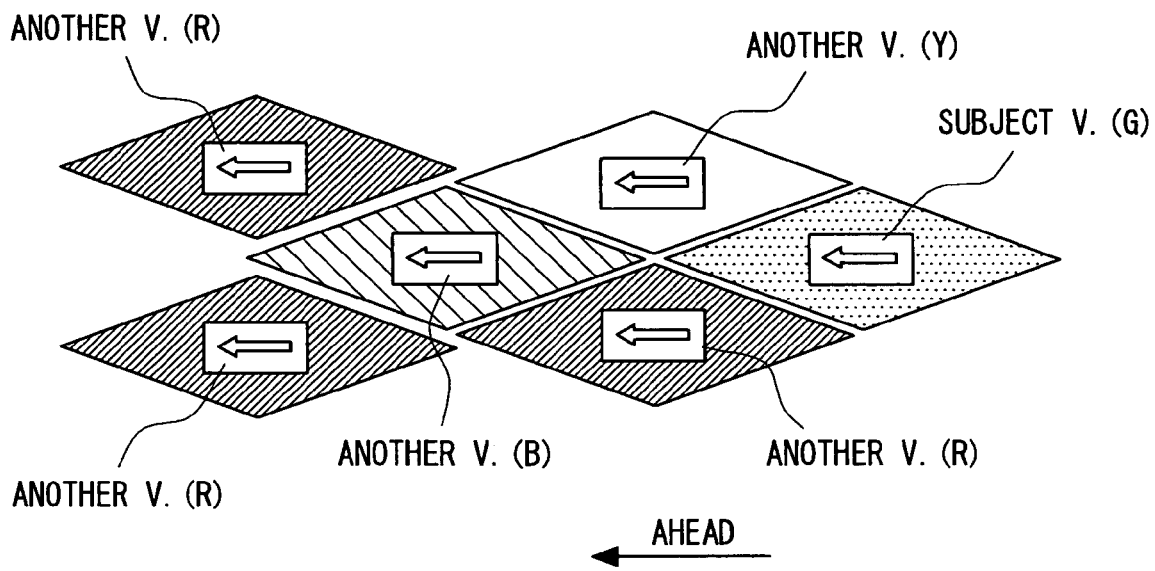
FIG. 2A is an explanatory diagram that explains assignment of color classification corresponding to communication wavelength to a subject vehicle and nearby vehicles.

<Description of Configuration of Vehicle-To-Vehicle Communication Device 1>

Figure 1:
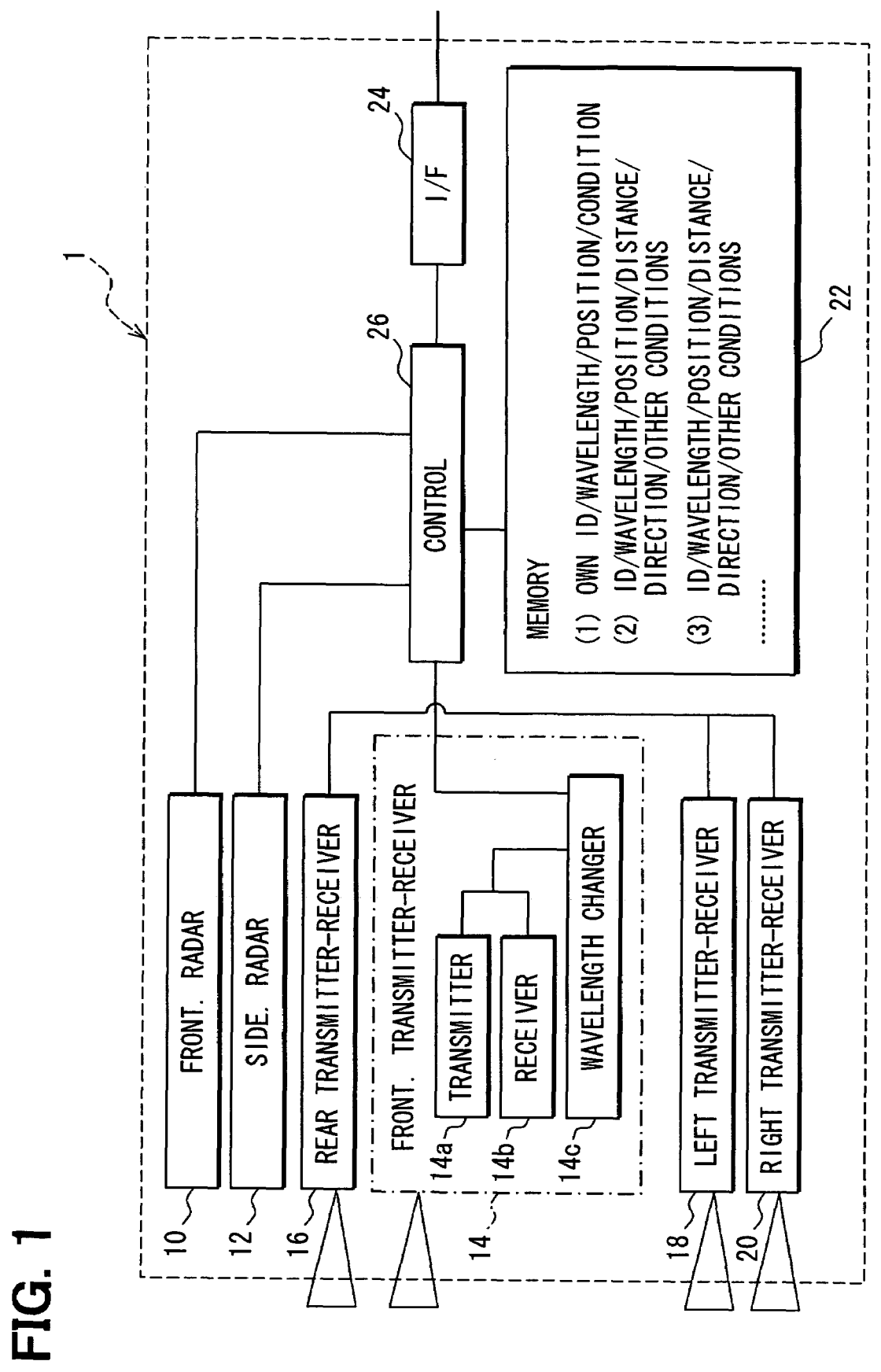

As illustrating in FIG. 1, a vehicle-to-vehicle communication device 1 in a subject vehicle includes: a frontward measuring radar 10; a sideward measuring radar 12; a frontward transmitter-receiver 14; a rearward transmitter-receiver 16; a leftward transmitter-receiver 18; a rightward transmitter-receiver 20; memory 22; an external I/F 24; and a communication control unit 26. The frontward measuring radar 10, sideward measuring radar 12, frontward transmitter-receiver 14, rearward transmitter-receiver 16, leftward transmitter-receiver 18, rightward transmitter-receiver 20, memory 22, and external I/F 24 are connected with the communication control unit 26, and are so constructed that they can communicate with one another.

<Description of Configuration of Frontward Measuring Radar 10 and Sideward Measuring Radar 12>

The frontward measuring radar 10 sends out millimeter waves, laser, or the like to the area ahead of the subject vehicle mounted with the vehicle-to-vehicle communication device 1, and receives reflected waves from objects present ahead of the subject vehicle.

The sideward measuring radar 12 sends out millimeter waves, laser, or the like to the area on the side of the subject vehicle, and receives reflected waves from objects present on the side of the subject vehicle. The sideward measuring radar 12 includes a right side radar unit and left side radar unit.

Thus, the frontward measuring radar 10 and sideward measuring radar 12 can detect a distance to the object; further, it can also detect a direction of the object relative to the subject vehicle by using a horizontally rotating function or a scan width limiting function.

<Description of Configuration of Transmitter-Receiver, such as Frontward Transmitter-Receiver 14>

Figure 3A:
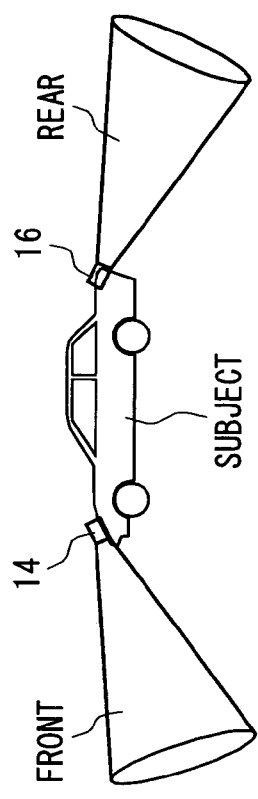
FIG. 3A is an explanatory side view illustrating communication areas of a frontward measuring radar and a rearward measuring radar of a vehicle-to-vehicle communication device in a subject vehicle.
Figure 3B:
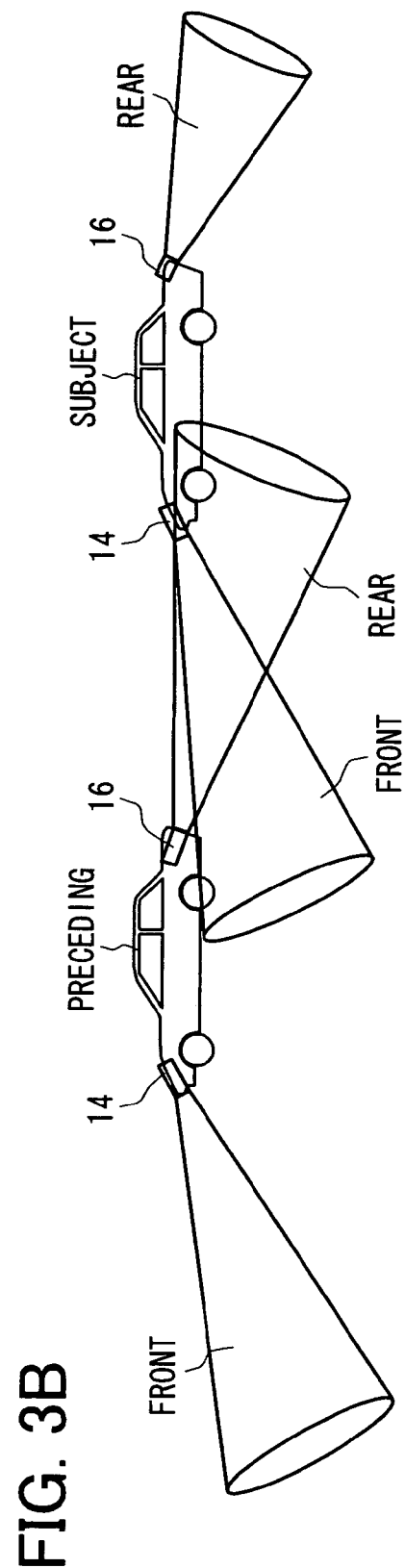
FIG. 3B is an explanatory side view illustrating communication areas of frontward measuring radars and rearward measuring radars of vehicle-to-vehicle communication devices in a subject vehicle and a nearby vehicle.

The frontward transmitter-receiver 14 is a device for transmitting and receiving radio waves or electromagnetic waves (including visible lights) for communication with other vehicle-to-vehicle communication devices mounted in nearby vehicles running ahead. It includes: a transmitter 14a that transmits radio wave forward; a receiver 14b that receives radio waves from ahead; and a communication wavelength changer 14c that changes the wavelength of radio waves. Communication areas are illustrated in FIG. 3A and FIG. 3B as examples.

The rearward transmitter-receiver 16 is a device that transmits and receives radio waves for communication with other vehicle-to-vehicle communication devices mounted in nearby vehicles running behind. It includes: a transmitter (not shown) that transmits radio waves rearward; a receiver (not shown) that receives radio waves from behind; and a communication wavelength changer (not shown) that changes the wavelength of radio waves. Communication areas are illustrated in FIG. 3A and FIG. 3B as examples.

Figure 3C:
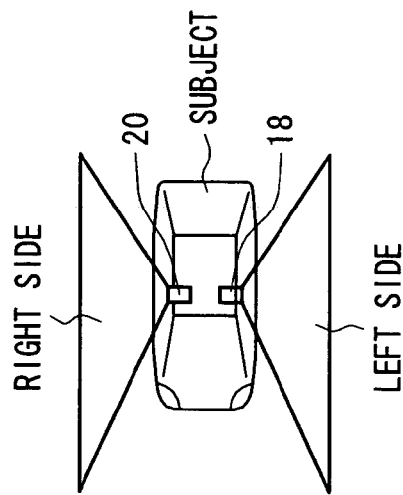
FIG. 3C is an explanatory plan view illustrating communication areas of sideward measuring radars of a vehicle-to-vehicle communication device in a subject vehicle.
Figure 3D:
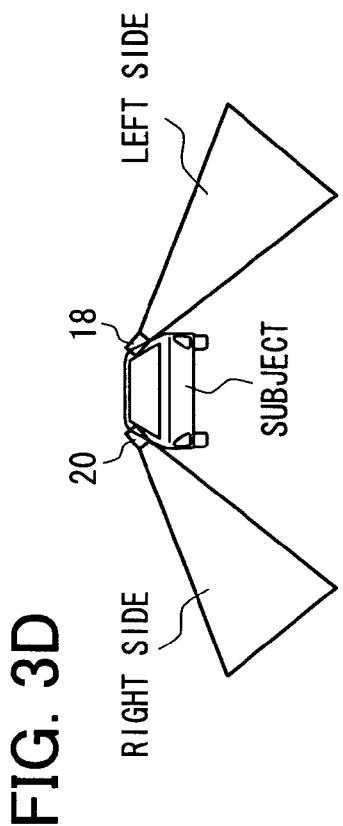
FIG. 3D is an explanatory front view illustrating communication areas of sideward measuring radars of a vehicle-to-vehicle communication device in a subject vehicle.

The leftward transmitter-receiver 18 is a device that transmits and receives radio waves for communication with other vehicle-to-vehicle communication devices mounted in nearby vehicles running on the left side. It includes: a transmitter (not shown) that transmits radio waves to the left; a receiver (not shown) that receives radio waves from the left; and a communication wavelength changer (not shown) that changes the wavelength of radio waves. Communication areas are illustrated in FIG. 3C and FIG. 3D as examples.

The rightward transmitter-receiver 20 is a device that transmits and receives radio waves for communication with other vehicle-to-vehicle communication devices mounted in nearby vehicles running on the right side. It includes: a transmitter (not shown) that transmits radio waves to the right; a receiver (not shown) that receives radio waves from the right; and a communication wavelength changer (not shown) that changes the wavelength of radio waves. Communication areas are illustrated in FIG. 3C and FIG. 3D as examples.

The frontward transmitter-receiver 14, rearward transmitter-receiver 16, leftward transmitter-receiver 18, and rightward transmitter-receiver 20 function as a communicating means.

<Description of Configuration of Memory 22>

The memory 22 is constructed of a non-volatile memory and is used to store varied data. As illustrated in FIG. 1 as an example, the memory 22 includes areas for recording communication information relating to the subject vehicle itself. The communication information with respect to the subject vehicle is used for transmitting data to an outside or nearby vehicles and includes (i) an own vehicle ID of the subject vehicle, (ii) a communication wavelength for transmitting data, and (iii) a current position as latitude and longitude, which obtained from a current position detector (not shown) included in the subject vehicle. The communication information is periodically (e.g., every 10 milliseconds) updated.

Further, as illustrated in FIG. 1 as an example, the memory 22 includes areas for recording communication information relating to nearby vehicles. The communication information with respect to each of nearby vehicles is recently received from the corresponding nearby vehicle and includes (i) a vehicle ID of the corresponding vehicle, (ii) a communication wavelength of the corresponding vehicle, (iii) a current position as latitude and longitude of the corresponding vehicle (iii) a distance from the subject vehicle, (iv) a direction from the subject vehicle, and (v) other communication conditions, i.e., suitable other conditions to communicate between the subject vehicle and the corresponding nearby vehicle. The communication information is also periodically (e.g., every 10 milliseconds) updated, e.g., as long as related information can be received by the transmitter-receivers 14, 16, 18, 20. The distance and direction can be roughly obtained based on received information on the current position or more accurately obtained by the frontward measuring radar 10 and the sideward measuring radar 12, which will be explained later.

The other communication conditions include several data with respect to the transmitter-receiver 14, 16, 18, 20 of the subject vehicle such as (i) a radiation direction and radiation beam of the radio wave for the subject vehicle to transmit radio waves and (ii) a reception direction and reception area for the subject vehicle to receive radio waves. The radiation beam can be variable from a given narrow beam (providing a narrow transmission area possibly covering a single nearby vehicle) to a given broad beam (providing a broad transmission area covering multiple nearby vehicles). The reception area can be variable from a given narrow area (providing a narrow reception area to possibly receive waves from a single nearby vehicle) to a given broad reception area (providing a broad reception area to receive waves from multiple nearby vehicles). The transmission area and reception area can be called a communication area as a whole.

Thus, in other words, the communication information with respect to each of nearby vehicles are communication conditions for the subject vehicle to communicate (transmit and receive) information more selectively with the each of nearby vehicles.

Under the above configuration in the memory 22, for instance, each of the transmitter-receivers 14, 16, 18, 20 periodically transmits, as broadcast, (i) a vehicle ID of the subject vehicle and (ii) a current position, i.e., latitude and longitude of the subject vehicle by using the currently selected communication wavelength under a certain communication condition. In a certain case, this broadcast information includes an identification of an addressee vehicle so as to notify the addressee vehicle of an alert of dangerous approximation with the subject vehicle, e.g., "Danger! Vehicle IDs xxx1234 and xyz1899 are very close to the addresser vehicle ID yxw 7777 (of the subject vehicle)." Further, in particular, the frontward transmitter-receiver 14 may transmit an alert of dangerous approximation with the subject vehicle to a certain vehicle very close to the subject vehicle by using the communication condition (i.e., specified radiation direction and narrow radiation beam) dedicated for the certain vehicle as needed. This allows the transmitted alert to more securely reach the certain vehicle very close to the subject vehicle. In contrast, each of the transmitter-receivers 14, 16, 18, 20 can be adjusted to receive radio waves from the certain nearby vehicle by selecting communication conditions (direction, narrow reception area) dedicated for the certain nearby vehicle.

Figures 4, 9:
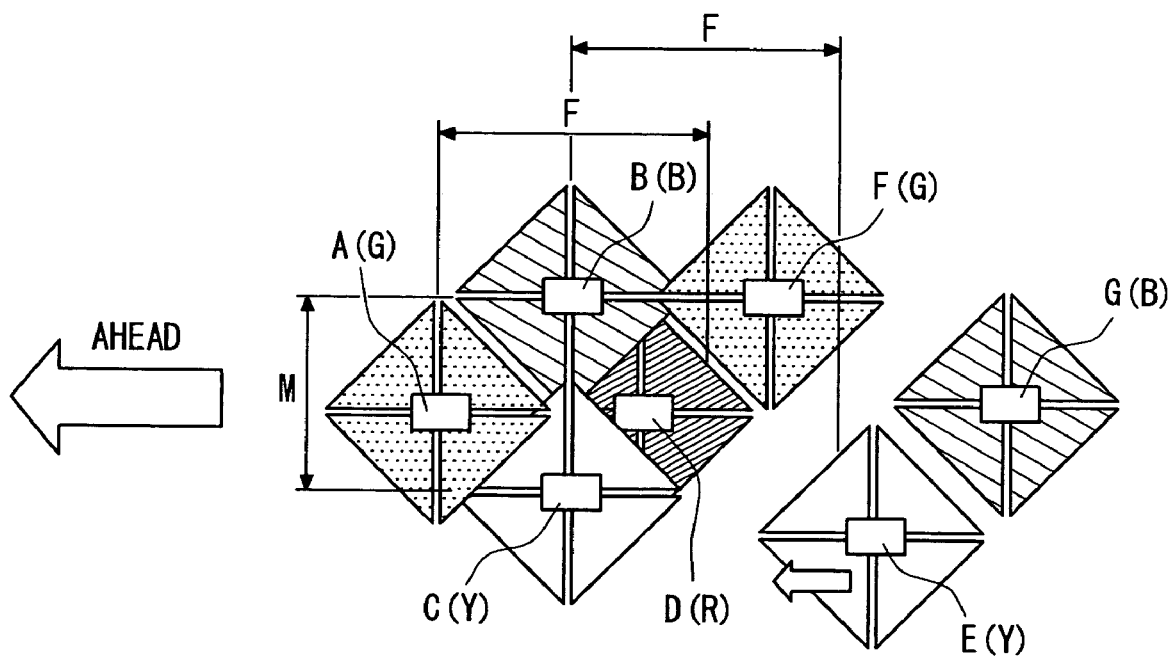
FIG. 4 is an explanatory diagram illustrating a limit distance determination list.
FIG. 9 is an explanatory diagram illustrating an example of a case where vehicles are running on a road.

The memory 22 also stores a "limit distance determination list" in which the running speed (km/hour) of the vehicle, limit distance F(m) for distance in the longitudinal direction, and limit distance M(m) for distance in the transverse, that is, width direction are correlated to one another, as illustrated in FIG. 4. The memory 22 functions as a communication condition storing means. When a nearby vehicle is present outside of the limit distance F, M of the subject vehicle, it is determined that the subject vehicle is located in a safe distance from the nearby vehicle. In contrast, when a nearby vehicle is present inside of the limit distance F, M of the subject vehicle, it is determined that the subject vehicle is located in a dangerous distance to the nearby vehicle.

Figure 2B:
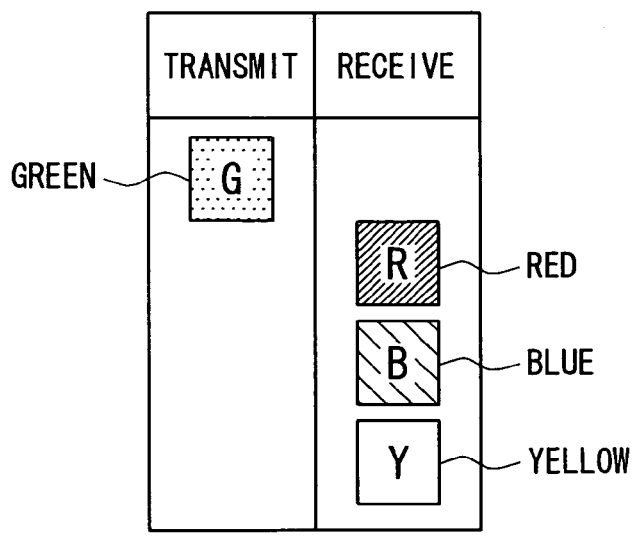
FIG. 2B is an explanatory diagram illustrating color classifications of transmitted and received radio waves in the subject vehicle.

For explanation, communication waves or wavelengths are simply indicated using color classifications. In this embodiment, as illustrated in FIGS. 2A, 2B, four color classifications, green (G), red (R), blue (B), and yellow (Y), are adopted to indicate four different wavelengths. In this example, the green (G) is used for the subject vehicle itself to transmit. The other colors (R), (B), (Y) are used for nearby vehicles to transmit and for the subject vehicle to receive. Generally, four different types are sufficient to differentiate neighboring vehicles, which are arranged in a lattice-shaped pattern. Five or more color classifications may be adopted instead.

In the example described with respect to this embodiment, visible light is used in communication. In this case, four different wavelengths that do not interfere with one another can be used. They can be appropriately selected from radio waves (medium frequency wave, short wave, micro wave, millimeter wave) as well as infrared laser and visible light laser.

<Description of Configuration of External I/F 24>

The external I/F 24 is connected with other external devices and carries out a function of inputting and outputting information with those external devices. The external I/F 24 is connected with various ECUs (not shown) as external devices. Thus, the external I/F 24 can carry out data communication with various ECUs through an in-vehicle LAN.

<Description of Configuration of Communication Control Unit 26>

The communication control unit 26 is constructed based on a publicly known microcomputer constructed of CPU, ROM, RAM, I/O, bus lines that connect these components, and the like, and it carries out varied processing according to programs stored in the ROM and the RAM.

The communication control unit 26 has functions of carrying out the following processing: it generates transmission signals based on varied data; it causes the individual transmitter-receivers to transmit the generated transmission signals as radio waves with a wavelength corresponding to the color classification assigned to the subject vehicle, and thereby communicate data to other vehicle-to-vehicle communication devices. The communication control unit 26 identifies the color classification assigned to the subject vehicle by referring to the data stored in the memory 22.

Further, the communication control unit 26 has a function of, when a radio wave sent out from any other vehicle-to-vehicle communication device is received by the individual transmitter-receivers, decoding data based on the reception signals outputted from the individual transmitter-receivers.

Further, the communication control unit 26 has functions of carrying out the following processing: it controls the frontward measuring radar 10 and the sideward measuring radar 12; it measures the distance between the subject vehicle and an object present ahead of or on the side of the vehicle based on (i) the millimeter wave, laser, or the like sent out by the frontward measuring radar 10 and the sideward measuring radar 12, (ii) time until reflected waves of them come back, and (iii) the like; and it measures the direction of the object from the subject vehicle by limiting the scan width and rotating the radiating direction in the frontward measuring radar 10 and the sideward measuring radar 12.

Further, the communication control unit 26 has a function of referring to data stored in the memory 22 and determining the wavelengths of radio waves transmitted by the transmitter-receivers 14, 16, 18, and 20. The communication control unit 26 carries out color classification change processing and vehicle-to-vehicle communication processing.

The communication control unit 26 has the following action: it periodically measures the movement in the longitudinal direction and the movement in the direction of the width of traffic lanes with respect to detected vehicles. Then, it stores the result of measurement in the memory 22 as "fluctuation." The communication control unit 26 samples data with respect to the width of this fluctuation by a preset number of times to determine the tendency of fluctuation. In this case, it carries out the following processing with respect to a vehicle, an amount of fluctuation of which has monotonously increased and become larger than a set following distance: it stores the data on the vehicle in the "area for recording not-target vehicles," which is not subjected to wavelength determination, in the memory 22. When the following distance from the subject vehicle further increases and it is not detected any more, the communication control unit 26 deletes that data. In cases where an amount of fluctuation tends to oscillate, the communication control unit 26 continues to recognize the vehicle as a target vehicle, which is subjected to wavelength determination. In cases where any measure is not taken, the communication wavelength of the subject vehicle must be frequently changed when a vehicle running ahead repeatedly gets close and draws apart in proximity to the set following distance. In cases where the fluctuation tends to oscillate and the vehicle running ahead is kept captured as a target vehicle to be subjected to wavelength determination, it is unnecessary to frequently change the communication wavelength.

The communication control unit 26 functions as communication controlling means, detection range setting means, presence of vehicle determining means, variability determining means, identity determining means, and storage controlling means.

<Description of Color Classification Change Processing>

Description will be given to the color classification change processing (or wavelength change processing) carried out periodically by the communication control unit 26 of the vehicle-to-vehicle communication device 1 with reference to the flowchart in FIG. 5 and FIGS. 2A and 2B.

This color classification change processing is carried out when an ignition key is operated by a driver and the subject vehicle is brought into accessory power supply (ACC) state.

First, the communication control unit 26 detects information indicating the speed of the subject vehicle from the outside of the vehicle-to-vehicle communication device 1 through the external I/F 24 (S105).

Subsequently, the communication control unit 26 refers to the limit distance determination list (Refer to FIG. 4) stored in the memory 22, and sets a safe following distance F and a safe vehicle-to-vehicle distance M based on the running speed of the subject vehicle (S110). An example will be taken. When the running speed is 50 km/hour, the communication control unit 26 sets a numerical value of "50" for the limit distance F(m) for the distance in the longitudinal direction, and sets a numerical value of "7" for the limit distance M(m) for the distance in the transverse, that is, width direction. In this case, the communication control unit 26 refers to the limit distance determination list, and carries out the following processing: when the running speed of the subject vehicle increases, it expands the detection range; and when the running speed of the subject vehicle decreases, it narrows the detection range.

Based on output signals from the frontward measuring radar 10 and sideward measuring radar 12, the communication control unit 26 detects longitudinal or traverse distances from the subject vehicle to vehicles running nearby (ahead or alongside the subject vehicle) (S115).

The communication control unit 26 determines whether or not each longitudinal distance from the subject vehicle to each vehicle running nearby is equal to or shorter than the limit distance F in the longitudinal (or traveling) direction (S120). In cases where it is determined that the each longitudinal distance from the subject vehicle to the vehicle running nearby is equal to or shorter than the limit distance F in the traveling direction (S120: NO), the communication control unit 26 determines that the subject vehicle and the vehicle running nearby have not gotten close to each other, and the processing is terminated.

In cases where it is determined that the longitudinal distance from the subject vehicle to the vehicle running nearby is equal to or shorter than the limit distance F in the traveling direction (S120: YES), the communication control unit 26 determines that the subject vehicle and the vehicle running nearby have gotten close to each other. Subsequently, it determines whether or not each traverse distance from the subject vehicle to the vehicle running nearby, which was determined to be equal to or shorter than the limit distance F, is equal to or shorter than the limit distance M in the traverse (or width) direction (S125). In cases where it is determined that the traverse distance from the subject vehicle to the vehicle running nearby is not equal to or shorter than the limit distance M in the width direction (S125: NO), the communication control unit 26 determines that the subject vehicle and the vehicle running nearby have not gotten close to each other, and the processing is terminated.

In cases where it is determined that the traverse distance from the subject vehicle to the vehicle running nearby is equal to or shorter than the limit distance M in the width direction (S125: YES), the communication control unit 26 determines that the subject vehicle and the vehicle running nearby have gotten close to each other. As a result, it is determined that the subject vehicle is located in a dangerous distance to the vehicle(s) running nearby.

Then, it refer to data stored in the memory 22, and determines whether or not the color classification (or wavelength) assigned to the subject vehicle and the color classification assigned to each of the vehicle(s) running nearby are identical with each other (S130). In other words, the communication control unit 26 determines whether or not a wavelength of radio waves transmitted from the subject vehicle and a wavelength of radio waves received from each of the vehicle(s) running nearby are identical with each other. For instance, in FIGS. 2A and 2B, the color classification of radio waves received from the vehicle running ahead is blue (B) while the color classification of the radio waves transmitted from the subject vehicle is green (G).

In cases where it is determined that the color classification assigned to the subject vehicle and the color classification assigned to the vehicle running ahead are not identical with each other (S135: NO), the communication control unit 26 terminates the processing. In contrast, in cases where it is determined that the color classification assigned to the subject vehicle and the color classification assigned to the vehicle running ahead are identical with each other (S135: YES), the communication control unit 26 selects a certain color classification different from that assigned to the vehicle running ahead for changing the color classification assigned to the subject vehicle (S140). At the same time, it updates the data associated with the subject vehicle, stored in the memory 22, using the selected certain color classification. The communication control unit 26 then transmits data by using a communication wavelength corresponding to the selected certain color classification to other vehicles (S145). For instance, the communication control unit 26 transmits an alert of dangerous approximation with the subject vehicle, e.g., "Danger! Vehicle IDs xxx1234 is very close to the addresser vehicle ID yxw 7777 (of the subject vehicle)." Then, one cycle of the processing is terminated.

<Description of Vehicle-To-Vehicle Communication Processing>

Description will be given to the vehicle-to-vehicle communication processing carried out by the communication control unit 26 of the vehicle-to-vehicle communication device 1 with reference to the flowchart in FIG. 6. Part of the processing, i.e., S205 to S232 is similar to the color classification change processing, i.e., S105 to S145 in FIG. 5. The additional part is a feature of the processing, which is to address fluctuation in movement of a vehicle nearby the subject vehicle. For simplifying explanation, it is assumed that only one vehicle is present ahead of the subject vehicle.

This vehicle-to-vehicle communication processing is carried out when an ignition key is operated by a driver and the subject vehicle is brought into accessory power supply (ACC) state.

First, the communication control unit 26 determines whether or not a vehicle is present ahead based on an output signal from the frontward measuring radar 10 (S205). In cases where it is determined that a vehicle is not present ahead (S205: NO), the communication control unit 26 waits until it is determined that a vehicle is present ahead. In cases where it is determined that a vehicle is present ahead (S205: YES), the communication control unit 26 measures the distance between the subject vehicle and that vehicle running ahead based on an output signal from the frontward measuring radar 10 (S210). Subsequently, the communication control unit 26 determines whether or not the distance between the subject vehicle and the vehicle running ahead is a safe following distance (S215). Specifically, it determines whether or not the distance from the subject vehicle to the vehicle running ahead is equal to or shorter than the limit distance F in the traveling direction.

In cases where it is determined that the distance from the subject vehicle to the vehicle running ahead is equal to or shorter than the limit distance F in the traveling direction, the communication control unit 26 determines that the subject vehicle and the vehicle running ahead have gotten close to each other and the distance between the subject vehicle and the vehicle running ahead is not a safe following distance (S215: NO). Then, the communication control unit 26 refers to data stored in the memory 22 to detect the communication wavelength of the vehicle running ahead (S220). In cases where the communication wavelength (or color classification) assigned to the vehicle running ahead is not identical with the communication wavelength (or color classification) assigned to the subject vehicle (S225: NO), the communication control unit 26 determines that the communication wavelength of the subject vehicle need not be changed. The communication control unit 26 then transmits information to the vehicle-to-vehicle communication device 1 of the vehicle running ahead by using the original communication wavelength (S232). Then, the processing is terminated.

In cases where the communication wavelength of the vehicle running ahead is identical with the communication wavelength of the subject vehicle (S225: YES), the communication control unit 26 determines that it is required to change the communication wavelength of the subject vehicle. Then, it changes the communication wavelength of the subject vehicle to a communication wavelength different from the communication wavelength of the vehicle running ahead, and stores the new communication wavelength in the memory 22 (S230). Further, the communication control unit 26 then transmits information to the vehicle-to-vehicle communication device 1 of the vehicle running ahead by using the newly selected communication wavelength (S232). Then, the processing is terminated.

In cases where it is determined at S215 that the distance from the subject vehicle to the vehicle running ahead is not equal to or shorter than the limit distance F in the traveling direction, the communication control unit 26 carries out a determination at S235. Namely, it determines whether the distance between the subject vehicle and the vehicle running ahead has been the safe following distance. In cases where the determination is affirmed (S235: YES), the processing is then terminated.

In contrast, in cases where the determination is negated (S235: NO), it determines the degree of variation in distances (S240). Specifically, the communication control unit 26 periodically measures the movement in the longitudinal direction and the movement in the direction of the width of traffic lanes. Then, it stores the result of measurement in the memory 22 as "fluctuation." The communication control unit 26 samples data with respect to the width of this fluctuation by a preset number of times to determine the tendency of "fluctuation." In cases where the amount of fluctuation tends to oscillate, the communication control unit 26 determines that the following distance is variable. In cases where it is determined that the following distance is variable (S245: YES), the communication control unit 26 transmits information to the vehicle-to-vehicle communication device 1 of the vehicle running ahead by using the original communication wavelength (S232). Namely, the vehicle running ahead, which is outside the limit distance F but has a variable following distance, is regarded to be equivalent to a vehicle ahead within the limit distance F. Then, the processing is terminated.

In cases where it is determined that the following distance is not variable (S245: NO), the processing is terminated.

<Examples of Color Classification Change Processing and Vehicle-to-Vehicle Communication Processing>

Figure 7A:
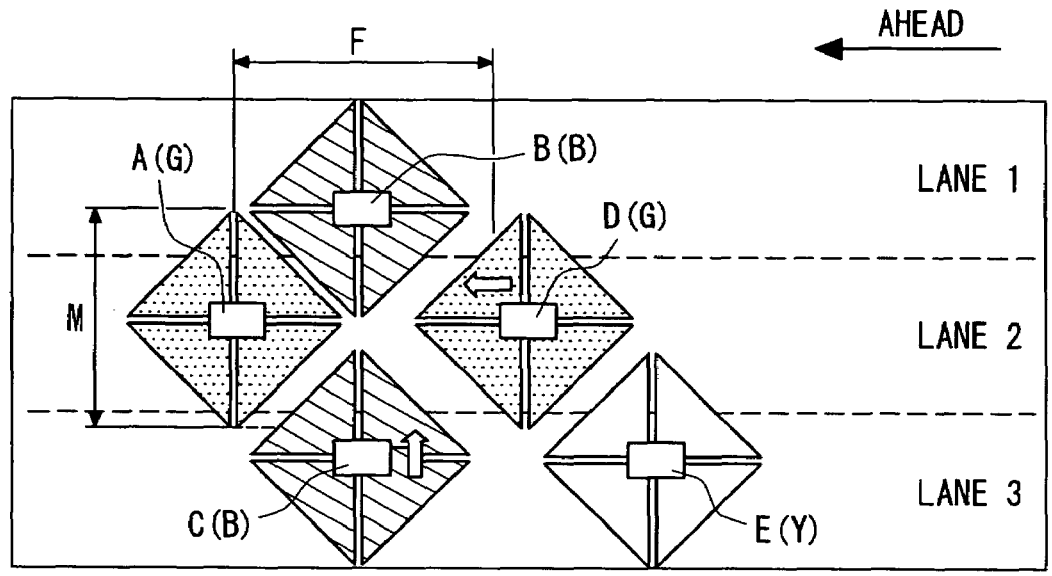
FIGS. 7A, 7B are explanatory diagrams illustrating examples of a case where vehicles are running on a road having three traffic lanes.
Figure 7B:
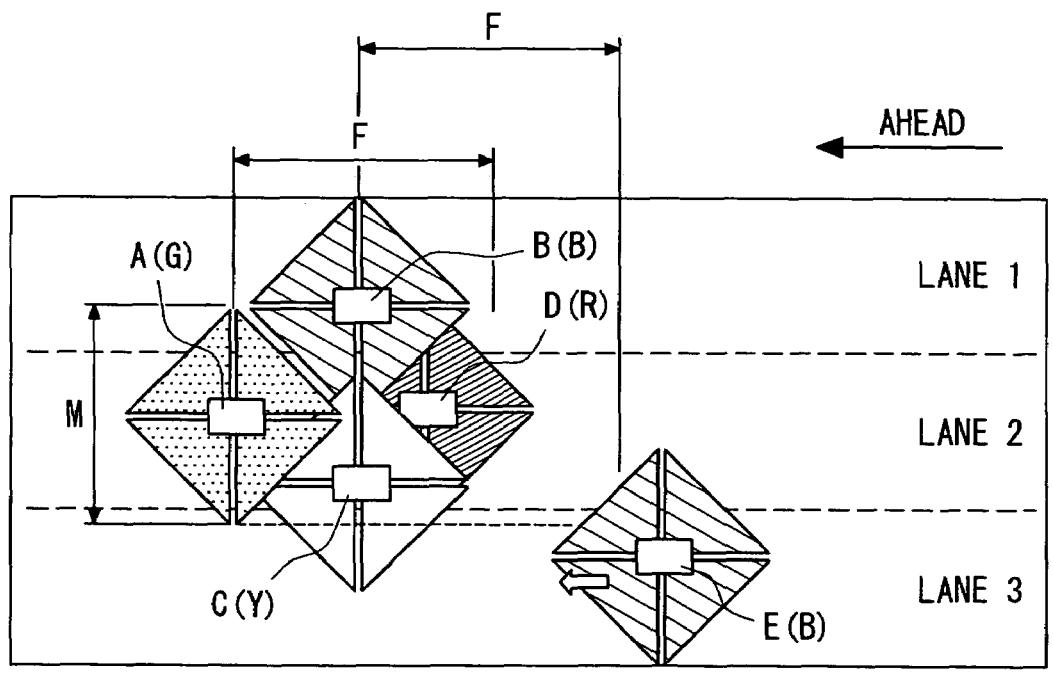

Description will be given to the above-mentioned color classification change processing and vehicle-to-vehicle communication processing with reference to FIG. 7A to FIG. 9, taking as examples cases where three to seven vehicles A to E are running on a road having one to three traffic lanes. FIGS. 7A, 7B are explanatory diagrams illustrating examples in which vehicles A to E are running on a road with three traffic lanes. FIG. 8 is an explanatory diagram illustrating an example in which vehicles A to C are running on a road with two traffic lanes. FIG. 9 is an explanatory diagram illustrating an example in which vehicles A to G are running on a road with one traffic lane.

First, description will be given to the case where vehicles A to E are running on a road with three traffic lanes, illustrated in FIG. 7A as an example. In this case, the color classification of vehicle A is green; the color classification of vehicle B is blue; the color classification of vehicle C is blue; the color classification of the vehicle D is green; and the color classification of vehicle E is yellow. When vehicle C moves to the right and comes within the limit distances F, M relative to vehicles A and B, vehicle C changes its own color classification from blue to yellow so that its color classification is not identical with the color classifications assigned to the nearby vehicles A, B. Subsequently, when vehicle D comes within the limit distances F, M relative to vehicles A, B, and C, vehicle D changes its own color classification from green to red so that its color classification is not identical with the color classifications assigned to the nearby vehicles A, B, and C.

Next, with reference to FIG. 7B, when vehicle E subsequently moves forward and comes within the limit distances F, M relative to vehicles C and D, vehicle E changes its own color classification from yellow to blue so that its color classification is not be identical with the color classifications assigned to the nearby vehicles C and D.

Figure 8A:
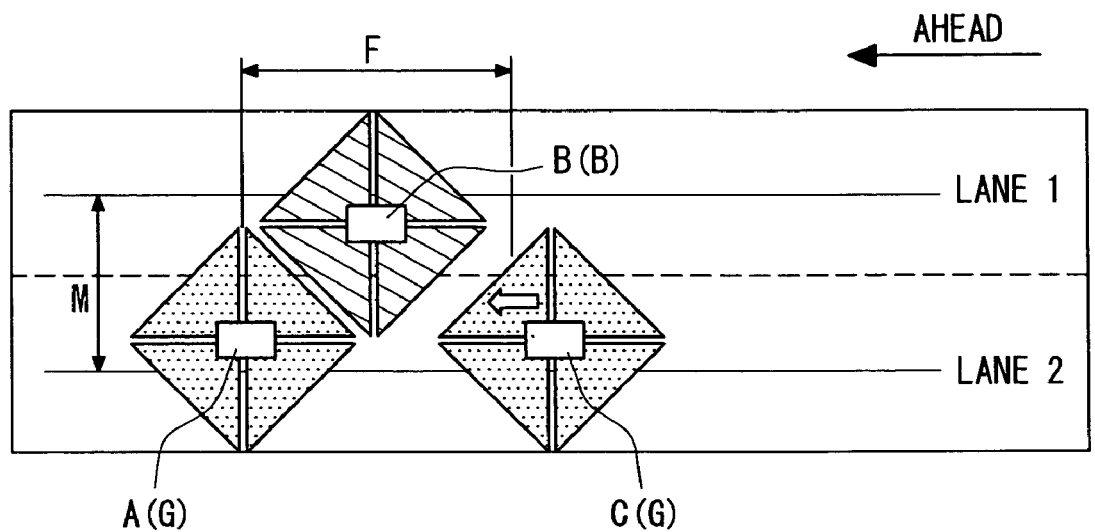
FIGS. 8A, 8B are explanatory diagrams illustrating examples of a case where vehicles are running on a road having two traffic lanes.
Figure 8B:
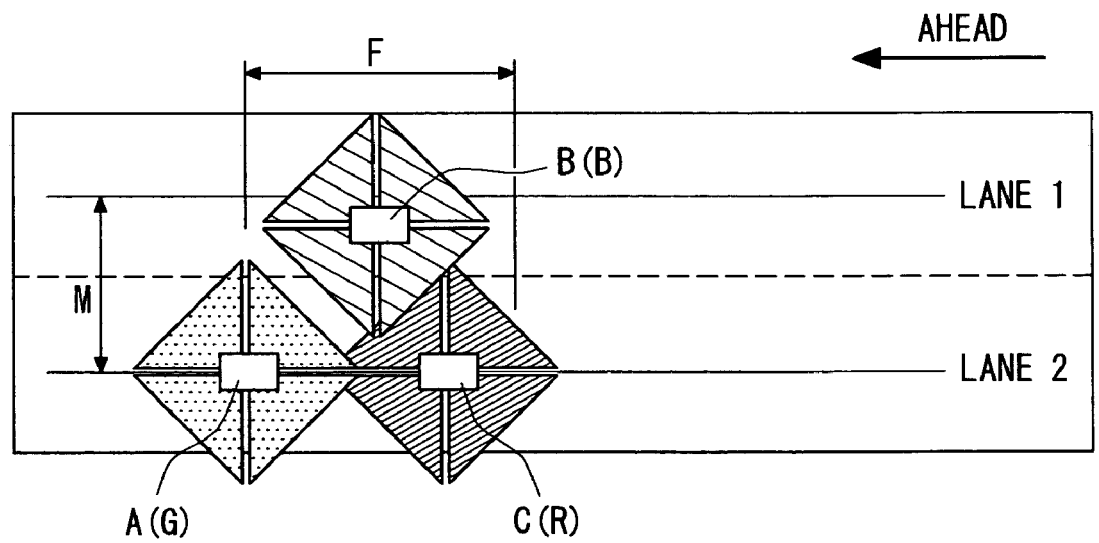

Next, description will be given to the case where vehicles A to C are running on a road with two traffic lanes, illustrated in FIGS. 8A, 8B as an example. In this case, the color classification of vehicle A is green; the color classification of vehicle B is blue; and the color classification of vehicle C is green, as shown in FIG. 8A. When vehicle C moves forward and comes within the limit distances F, M relative to vehicles A and B, vehicle C changes its own color classification from green to red so that its color classification is not be identical with the color classifications assigned to the nearby vehicles A and B, as shown in FIG. 8B.

Description will be given to the case where vehicles A to G are running on a road without having traffic lane marker, illustrated in FIG. 9 as an example. In this case, the color classification of vehicle A is green; the color classification of vehicle B is blue; the color classification of vehicle C is yellow; the color classification of vehicle D is red; the color classification of vehicle E is blue; the color classification of vehicle F is green; and the color classification of vehicle G is blue. When vehicle E moves forward and comes within the limit distances F, M relative to vehicles C and D, vehicle E changes its own color classification to blue so that its color classification is not be identical with the color classifications assigned to the nearby vehicles C, D. Then, vehicle G changes its own color classification to yellow so that its color classification is not be identical with the color classifications assigned to the nearby vehicles F, E.

<Effects>

(1) According to a vehicle-to-vehicle communication device 1 in the first embodiment, as mentioned above, such effects as described below are brought about. Conventional running control devices involve a problem. When multiple vehicles are present ahead, light (or electromagnetic wave) is prone to be intercepted by those vehicles and thus it is difficult to appropriately carry out communication between vehicles by light. Also, when light from an oncoming vehicle is received as noise, it is difficult to appropriately carry out communication between vehicles by light. The vehicle-to-vehicle communication device 1 in the first embodiment communicates with nearby vehicles under use of different communication wavelengths set on a vehicle-by-vehicle basis. Even when multiple vehicles are present ahead, therefore, communication can be appropriately carried out between vehicles.

(2) In the vehicle-to-vehicle communication device 1 in the first embodiment, at least four different color classifications or four different communication wavelengths are set. For this reason, different color classifications can be assigned to adjacent vehicles and the subject vehicle.

(3) The vehicle-to-vehicle communication device 1 in the first embodiment is so constructed that it communicates mainly with a vehicle running ahead within a predetermined range from the subject vehicle. Thus, vehicles present within a detection range are taken as the main targets of communication. This makes it possible to limit the number of vehicles with which communication is effectively simultaneously carried out, and to prevent load on the communication control unit 26 of the vehicle-to-vehicle communication device 1 from being increased.

(4) In the vehicle-to-vehicle communication device 1 in the first embodiment, the communication control unit 26 refers to the limit distance determination list and carries out the following processing: when the running speed of the subject vehicle is enhanced, it expands the detection range; and when the running speed of the subject vehicle is lowered, it narrows the detection range. As a result, it can be expected that an appropriate number of nearby vehicles present within the detection range are maintained as the target for communication.

(5) The vehicle-to-vehicle communication device 1 in the first embodiment is so constructed that the following is implemented: when the communication control unit 26 detects the "following distance variable state," in which one and the same nearby vehicle repeatedly comes into and goes out of the limit distance or range, it does not take that nearby vehicle as a target of communication. Thus, when the "following distance variable state" is detected, the processing related to that nearby vehicle can be prevented from being repeatedly carried out. As a result, load on the communication control unit 26 of the vehicle-to-vehicle communication device 1 can be prevented from being increased.

(6) When it is determined that the color classification assigned to the subject vehicle and the color classification assigned to a nearby vehicle are identical with each other, the vehicle-to-vehicle communication device 1 in the first embodiment carries out the following processing: it changes the color classification assigned to the subject vehicle so that its color classification is not identical with the color classification assigned to the nearby vehicle; it updates data stored in the memory 22 with the color classification newly assigned to the subject vehicle; and it communicates to nearby vehicles information by using the color classification newly assigned to the subject vehicle. This changing process is continuously and dynamically repeated. This makes it possible for the subject vehicle to maintain a proper color classification, which is different from color classifications assigned to nearby vehicles, which also chronologically and dynamically change their color classifications.

(Modifications)

Up to this point, description has been given to an embodiment of the invention. However, the invention is not limited to the above-mentioned embodiment, and can be embodied in various modes.

(1) For example, even when a vehicle is not provided with an ignition key, i.e., when a vehicle is an electric vehicle, the invention can be modified so that the communication processing is started by actuation of a starter for the vehicle.

Figure 10:
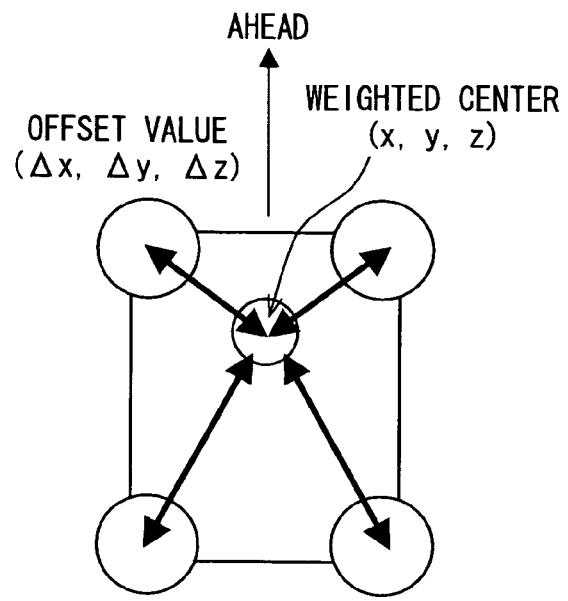
FIG. 10 is an explanatory view illustrating an offset value of a transmitter-receiver relative to a weighted center of a vehicle.

(2) Information transmitted by the vehicle-to-vehicle communication device 1 can include an offset value indicating a relative position of each transmitter-receiver to a weighted center of a corresponding vehicle as shown in FIG. 10. By using the offset value, a vehicle, which receives information on the offset value of the transmitter-receiver, can accurately determine the position of the transmitter-receiver of the opponent vehicle. This allows more accurate communication between the vehicles.

(3) Further, Information transmitted by the vehicle-to-vehicle communication device 1 can further includes information such as a traveling direction, a travel lane, a vehicle shape including a length and a width, or the like. These detail information items help a vehicle which receives the information accurately detect a vehicle, which transmitted the information.

Figure 11:
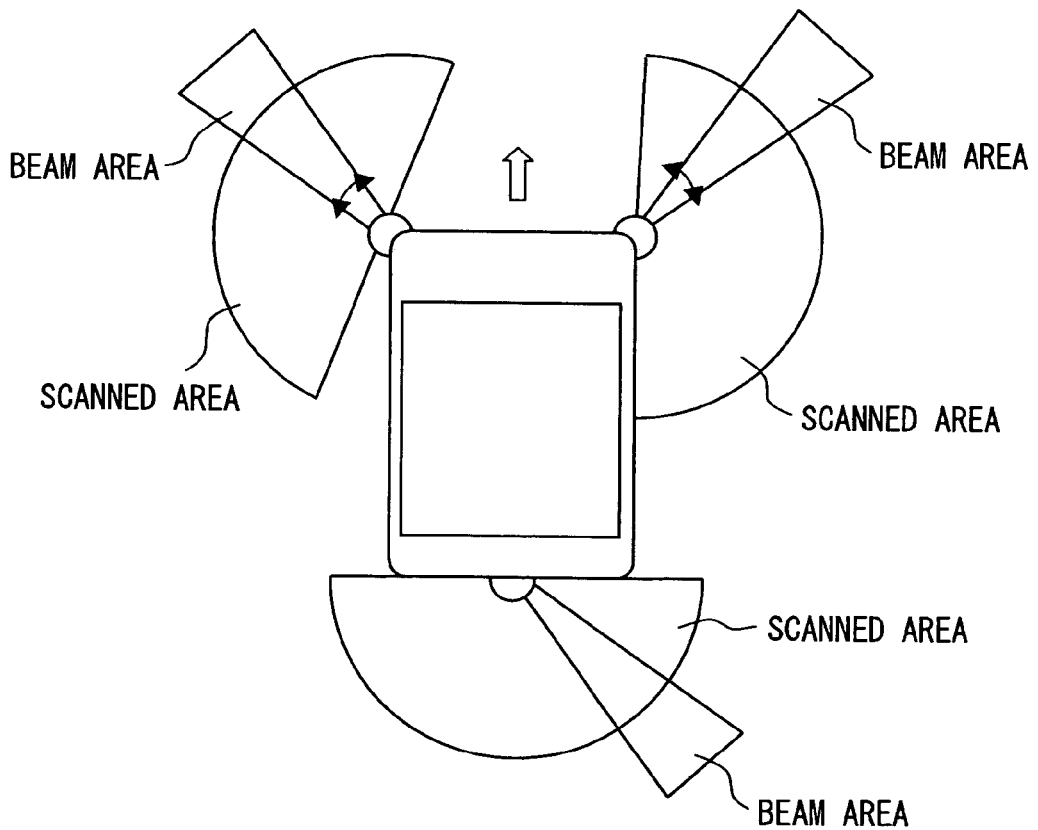
FIG. 11 is an explanatory view illustrating a beam area and scanned area of each measuring radar.

(4) The measuring radar can be designed as shown in FIG. 11. Each radar of two frontward measuring radars and a rearward measuring radar can have a relatively narrow beam area to rotate so as to cover a scanned area of about 180 degrees or more. In this structure, the radar can detect a distance and a direction of an object nearby the subject vehicle.

Figure 12:
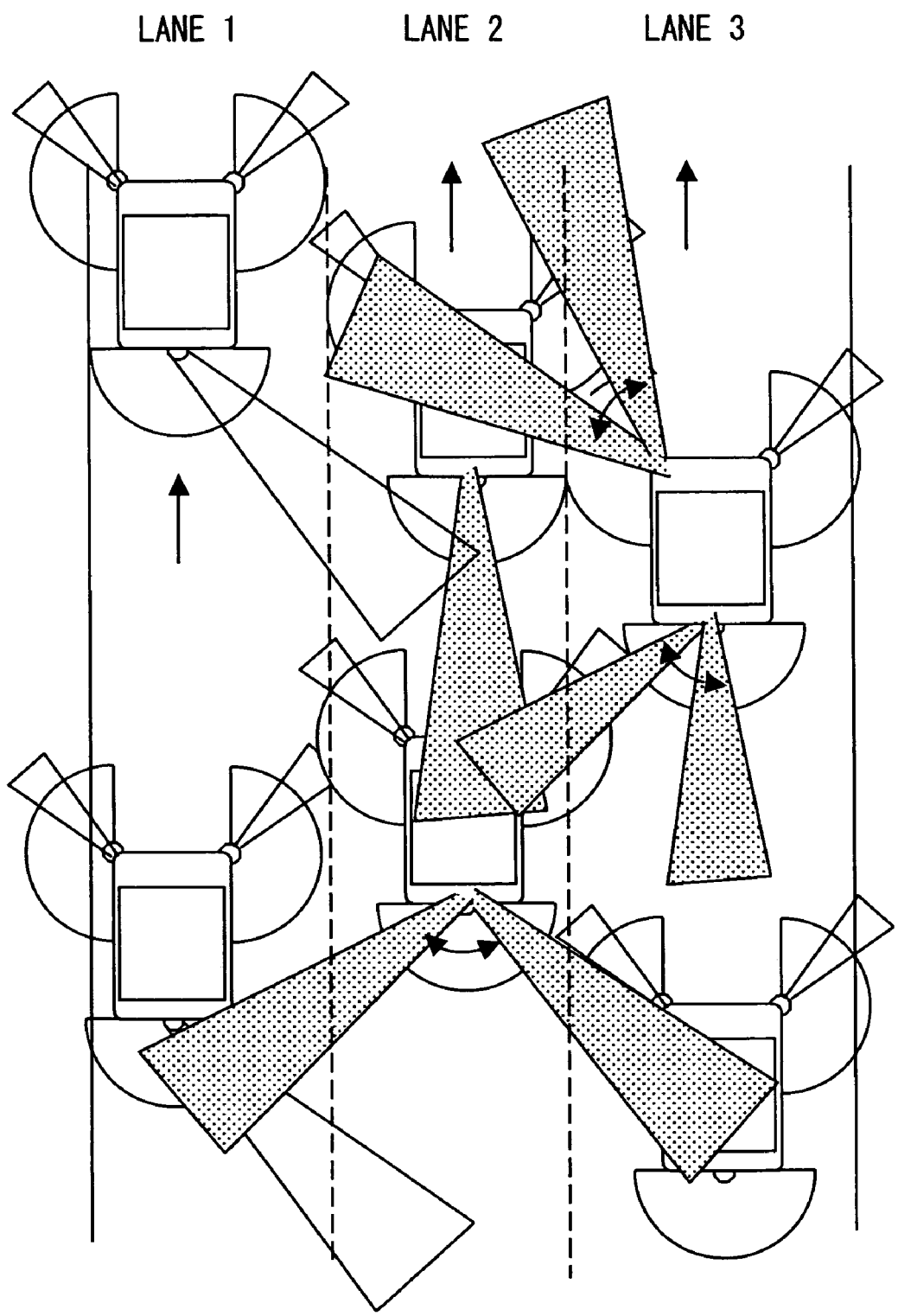
FIG. 12 is an explanatory view illustrating communications by each transmitter-receiver having a directional communication area and covering a wide communication area by rotating the directional communication area.

(5) Further, a transmitter-receiver can be also designed to have a directional communication area and cover a wide communication area by rotating the directional communication area, as shown in FIG. 12. Further, an output power may be also varied depending on situations as needed. In this structure, communication between specified vehicles can be accurately performed. Further, the measuring radar may be omitted.

Figure 5:
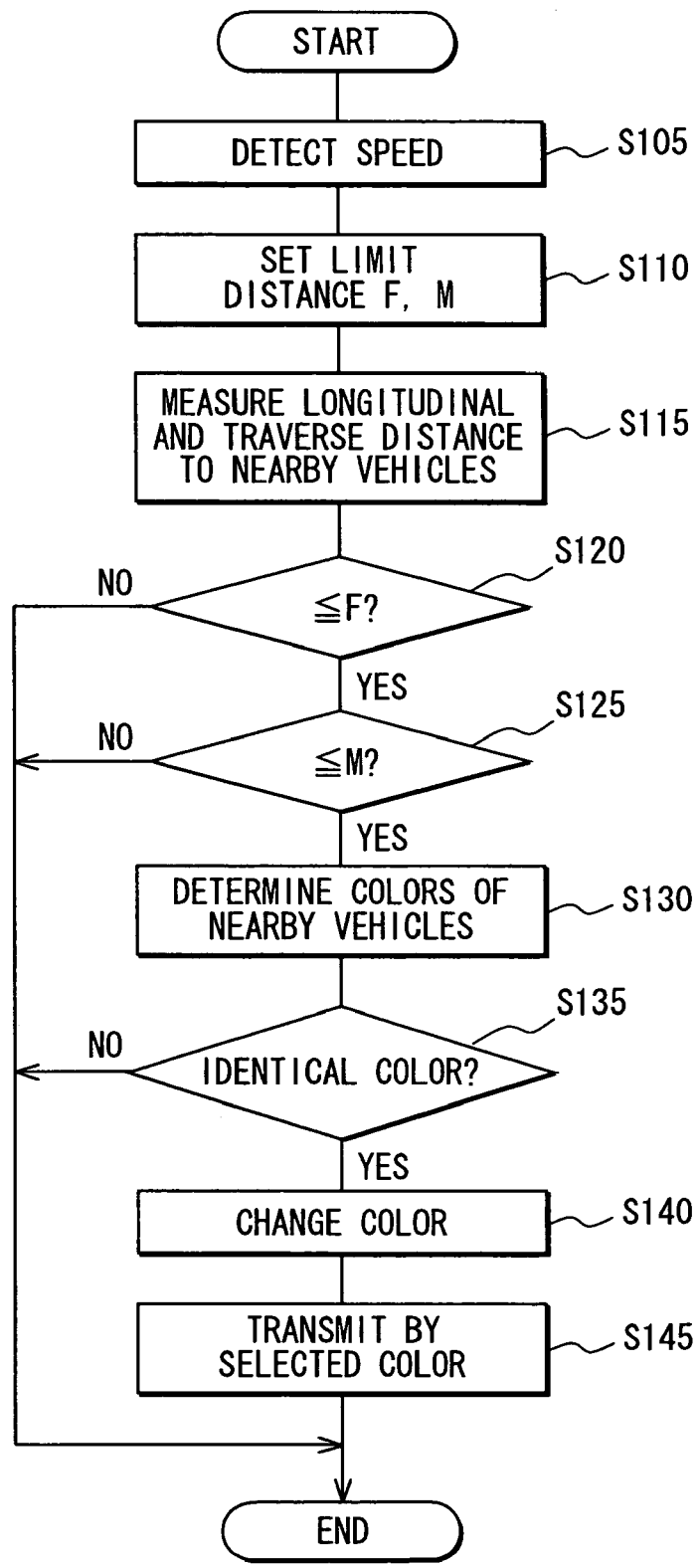
FIG. 5 is a flowchart for explaining color classification change processing.
Figure 6:
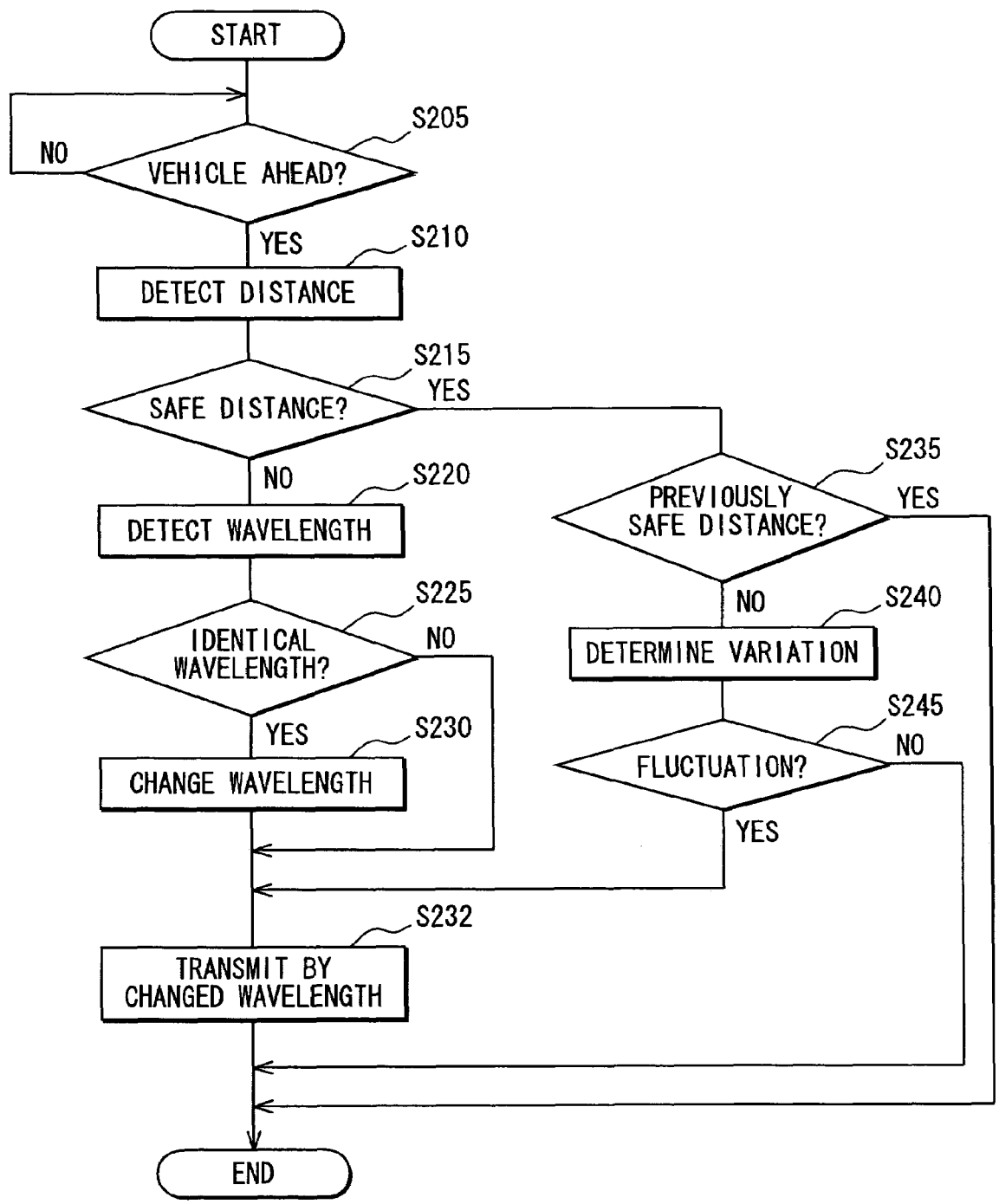
FIG. 6 is a flowchart for explaining vehicle-to-vehicle communication processing.

(6) Further, in FIG. 5, after the communication control unit 26 selects a certain color classification for changing the color classification assigned to the subject vehicle (S140), another step can be added. For instance, the communication control unit 26 then transmits data by using the original color classification or original communication wavelength to notify other vehicles that the color classification of the subject vehicle will be changed to the selected certain color classification.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A vehicle-to-vehicle communication system including a plurality of vehicle-to-vehicle communication devices that are mounted in vehicles and communicate with one another, and a vehicle-to-vehicle communication device provided in a subject vehicle, the vehicle-to-vehicle communication device provided in the subject vehicle comprising:
   a communication wavelength storing unit that stores communication wavelengths assigned to the subject vehicle and nearby vehicles;
   a communication condition storing unit that stores communication conditions with respect to communication wavelengths stored in the communication wavelength storing unit;
   a communicating unit for communication with other vehicle-to-vehicle communication devices mounted in the nearby vehicles;
   a communication controlling unit that
   (i) refers to the communication conditions stored in the communication condition storing unit,
   (ii) controls the communicating unit under a communication condition corresponding to a communication wavelength assigned to the subject vehicle to transmit information to other vehicle-to-vehicle communication devices, and
   (iii) controls the communicating unit under a communication condition corresponding to a communication wavelength assigned to a nearby vehicle to receive information transmitted from a vehicle-to-vehicle communication device mounted in the nearby vehicle;
   an identity determining unit that refers to data stored in the communication wavelength storing unit and determines whether or not a communication wavelength assigned to the subject vehicle and a communication wavelength assigned to a nearby vehicle are identical with each other; and
   a first storage controlling unit that, when it is determined by the identity determining unit that the communication wavelength assigned to the subject vehicle and the communication wavelength assigned to the nearby vehicle are identical with each other, changes the communication wavelength assigned to the subject vehicle so that a new communication wavelength is not identical with the communication wavelength assigned to the nearby vehicle, and updates data stored in the communication wavelength storing unit with the new communication wavelength newly assigned to the subject vehicle,
   wherein the vehicle-to-vehicle communication device provided in the subject vehicle further comprises:
   a vehicle speed detecting unit that detects a running speed of the subject vehicle;
   a detection range setting unit that sets a detection range for detecting nearby vehicles according to the running speed detected by the vehicle speed detecting unit; and
   a nearby vehicle determining unit that determines whether or not a vehicle is present within the detection range set by the detection range setting unit, and
   wherein when it is determined by the nearby vehicle determining unit that a certain vehicle is present within the detection range, the communication controlling unit defines the certain vehicle as a nearby vehicle and communicates selectively with a vehicle-to-vehicle communication device mounted in the certain vehicle.

2. The vehicle-to-vehicle communication system of claim 1, wherein the communication conditions with respect to the nearby vehicles include information to allow the communication controlling unit of the subject vehicle to change an own communication wavelength.

3. The vehicle-to-vehicle communication system of claim 1, wherein at least four different communication wavelengths are included in the communication wavelengths.

4. The vehicle-to-vehicle communication system of claim 1, wherein the detection range setting unit expands the detection range when the running speed of the subject vehicle increases and narrows the detection range when the running speed of the subject vehicle decreases.

5. The vehicle-to-vehicle communication system of claim 1,
   wherein the vehicle-to-vehicle communication device provided in the subject vehicle further comprises: a variability determining unit that determines whether or not a nearby vehicle determined to be present within the detection range by the nearby vehicle determining unit is in a distance variable state, and
   wherein when it is determined by the variability determining unit that a certain nearby vehicle is in a distance variable state, the communication controlling unit does not change a communication wavelength assigned to the subject vehicle based on a communication wavelength assigned to the certain nearby vehicle.

6. The vehicle-to-vehicle communication system of claim 1, wherein the vehicle-to-vehicle communication devices provided in the subject vehicle further comprises: a second storage controlling unit that, when the communicating unit receives notice that a communication wavelength assigned to a nearby vehicle has been changed from a vehicle-to-vehicle communication device mounted in the nearby vehicle, updates data stored in the communication wavelength storing unit with a new communication wavelength newly assigned to the nearby vehicle.

* * * * *